July 11, 1933.  A. ROSENTHAL  1,917,996
CORN HUSKER
Filed Oct. 17, 1930
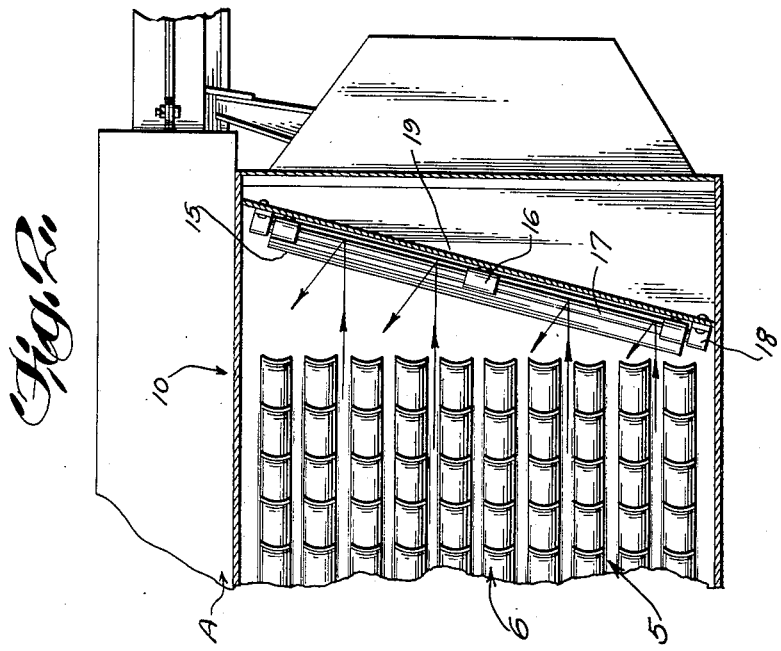
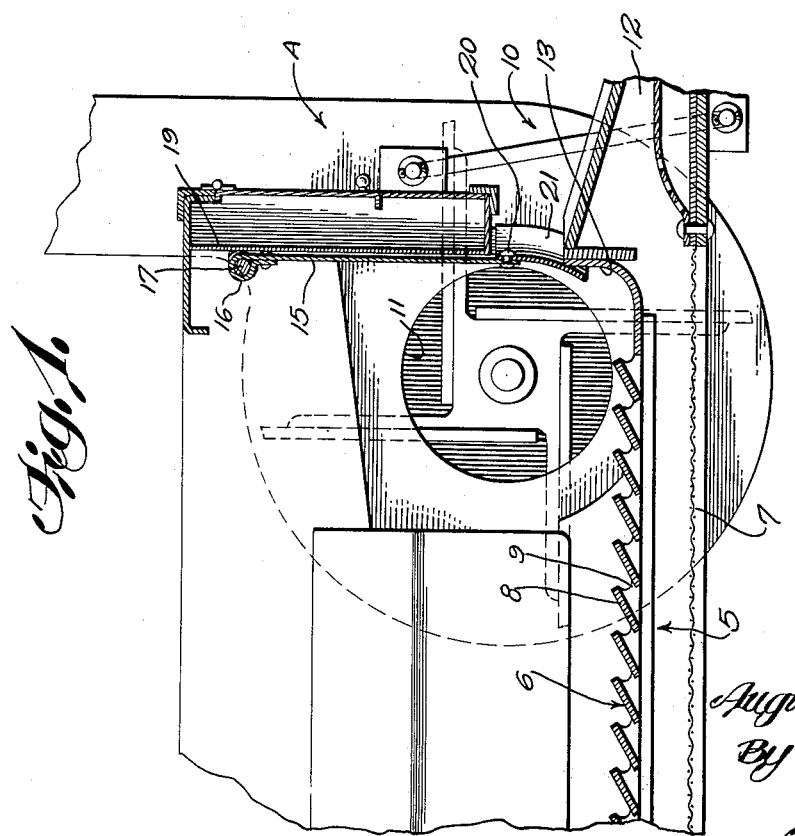
Inventor
August Rosenthal
By
Attorneys Patented July 11, 1933

1,917,996

UNITED STATES PATENT OFFICE

AUGUST ROSENTHAL, OF WEST ALLIS, WISCONSIN, ASSIGNOR TO ROSENTHAL CORN HUSKER CO., OF WEST ALLIS, WISCONSIN

CORN HUSKER

Application filed October 17, 1930. Serial No. 489,381.

This invention appertains to corn huskers of the general type shown in my prior patents, 1,228,971 and 1,629,930 issued June 5, 1917 and May 24, 1927 respectively, and more particularly to the shaker trough of such corn husking machines.

One of the primary objects of this invention is the provision of means for directing and working the cut material on the trough toward the inlet opening of the stacker blower, thereby preventing the clogging of the material on the shaker trough and the consequent efficient operation of the machine.

Another important object of my invention is the provision of a plate extending angularly across the shaker trough toward the blower inlet opening, so that the cut material striking the plate will be directed over toward the inlet opening of the stacker blower and be picked up by said blower.

A further important object of my invention is the provision of a swinging plate carried by the corn husking machine and located adjacent to one end of the shaker trough and extending diagonally across the same, the lower edge of the plate having a depending flexible flap or apron arranged in the path of a part of the shaker trough whereby the plate will be rocked back and forth by the shaker trough during the reciprocation thereof, the swinging of the plate engaging the material on the trough and working the same over toward the intake opening of the blower.

With these and other objects in view the invention consists in the novel construction, arrangement and formation of parts as will be hereinafter more specifically described, claimed, and illustrated in the accompanying drawing in which:

Figure 1 is a sectional view through a corn husker showing my invention incorporated therein.

Figure 2 is a fragmentary horizontal section through a portion of the corn husking machine looking down on the shaker trough and showing the position of my novel rocking plate relative thereto.

Referring to the drawing in detail herein similar reference characters designate corresponding parts throughout the several views, the letter A generally indicates a corn husking machine having a reciprocatory shaker trough 5 provided with the main bottom 6 and the screen 7. The main bottom 6 is provided with struck up lips 8 and adjacent aperture 9 and acts to separate dust, dirt and kernels of corn from the cut material. The frame of the corn husker at one end thereof carries a stacker blower 10 having the axial intake opening 11 located at one side of and adjacent to the upper face of the main bottom 6. One end of the shaker trough 5 carries a discharge head 12 and the end of the main bottom 6 adjacent to said discharge head is provided with an upturned flange 13 which tends to retain the cut material on the main bottom of the shaker trough.

In accordance with my invention I provide a swinging plate 15 located above the shaker trough adjacent to the outer end thereof. This plate 15 extends angularly across the trough toward the intake opening 11 of the blower 10. As shown the upper end of the plate 15 carries suitable bearings or hinge barrels 16 for receiving the pivot rod 17. The pivot rod 17 is supported by suitable brackets 18 riveted or otherwise secured to a partition wall 19 extending across the frame of the machine.

The extreme lower edge of the plate 15 has secured thereto, such as by rivets 20 a depending flexible flap or apron 21. This flap or apron 21 can be made of rubber if so desired and is arranged in the path of the upstanding flange 13 on the main bottom 6 of the shaker trough.

By this construction, it can be seen that during the reciprocation of the shaker trough 5 the plate 15 will be swung back and forth and this plate and its apron 21 will engage the cut material on the trough and direct the same toward the intake opening 11 of the blower where the same can be readily drawn into said blower. Due to the angular arrangement of the plate with its apron relative to the trough the cut material striking the plate and its apron will be directed in an angular path toward the intake opening 11 of the blower, as shown diagrammatically by the arrows in Figure 2 of the drawing.

From the foregoing description it can be seen that I have provided an exceptionally simple and durable means for preventing the packing of the cut material on the shaker trough and for efficiently directing said cut material toward the intake opening of the stacker blower.

Changes in details may be made without departing from the spirit or the scope of this invention but what I claim as new is:

1. The combination of a corn husking machine having a shaker trough, a blower at one side of the trough and adjacent to one end thereof provided with an intake opening for receiving cut material from the trough, a diagonally extending plate mounted above the trough and hingedly carried by the corn husking machine, said plate leading toward the intake opening, and a depending flexible apron carried by the lower edge of the movable plate and arranged in the path of a portion of the shaker trough whereby the plate will be rocked by said shaker trough.

2. The combination of a corn husking machine having a shaker trough, a stacker blower at one side of the trough adjacent to one end thereof and provided with an intake opening for receiving cut material from the trough, a swinging plate mounted above the trough and extending diagonally across the same adjacent to the mentioned end and inclining toward the intake opening of the blower and means for moving the plate during actuation of the shaker trough.

3. In a corn husking machine having a shaker trough and an outlet for reiving cut material from the trough, a plate hingedly mounted above and independent of the shaker trough and extending diagonally across the same inclining toward the outlet, and a flexible apron arranged above the trough carried by the lower end of the plate for engagement with the trough during the movement thereof as and for the purpose specified.

In testimony that I claim the foregoing I have hereunto set my hand at West Allis, in the county of Milwaukee and State of Wisconsin.

AUGUST ROSENTHAL.